(12) United States Patent
Dembinski et al.

(10) Patent No.: US 9,824,100 B2
(45) Date of Patent: Nov. 21, 2017

(54) TECHNOLOGY FOR IMPORTING SCHEMA CHANGES TO MULTIPLE TARGET SYSTEMS

(71) Applicant: International Business Machines Corporation, Armonk, NY (US)

(72) Inventors: John R. Dembinski, San Jose, CA (US); Tom U. Jensen, Lyngby (DK); Vijaya Katikireddy, San Jose, CA (US); Joseph W. Reynolds, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 278 days.

(21) Appl. No.: 14/304,921

(22) Filed: Jun. 14, 2014

(65) Prior Publication Data

US 2015/0363395 A1 Dec. 17, 2015

(51) Int. Cl.
*G06F 17/30* (2006.01)

(52) U.S. Cl.
CPC ...... *G06F 17/303* (2013.01); *G06F 17/30292* (2013.01)

(58) Field of Classification Search
CPC .................................................. G06F 17/303
See application file for complete search history.

(56) References Cited

U.S. PATENT DOCUMENTS

| | | | |
|---|---|---|---|
| 5,410,693 A * | 4/1995 | Yu | G06F 21/6227 |
| 6,208,998 B1 * | 3/2001 | Marcus | G06F 21/606 |
| 6,397,125 B1 | 5/2002 | Goldring et al. | |
| 7,478,111 B2 | 1/2009 | Tong et al. | |
| 8,161,001 B2 | 4/2012 | Di Carlo et al. | |
| 8,204,848 B2 | 6/2012 | Sinha | |
| 2003/0088654 A1 * | 5/2003 | Good | H04L 29/12132 709/223 |
| 2006/0171405 A1 * | 8/2006 | Brendle | G06F 9/466 370/412 |

(Continued)

OTHER PUBLICATIONS

Young-Gook Ra et al.; "A Tranparent Object-Oriented Schema Change Approach Using View Evolution", University of Michigan, Software Systems Research Lab., Apr. 1994, pp. 1-39.

(Continued)

*Primary Examiner* — Apu Mofiz
*Assistant Examiner* — Dara J Glasser
(74) *Attorney, Agent, or Firm* — Anthony V. S. Englan; Erik K. Johnson

(57) ABSTRACT

Applying a change statement to target databases includes creating a central change identifier and associating the central change identifier and change statement to respective target databases, including creating an association identifier for each respective target database. The central change identifier, the change statement and a respective association identifier are provided for sending to each respective target database. A change status is presented, which indicates occurrence of a current processing event by a respective target database, including showing the change status associated with the central change identifier and the respective target database in response to receiving the change status, the central change identifier and a change statement indicator from the respective target database.

17 Claims, 6 Drawing Sheets

(56) References Cited

U.S. PATENT DOCUMENTS

| | | | |
|---|---|---|---|
| 2010/0005124 A1* | 1/2010 | Wagner | G06F 17/30575 |
| | | | 707/E17.005 |
| 2010/0088351 A1 | 4/2010 | Dehmann et al. | |
| 2011/0078113 A1 | 3/2011 | Franz | |
| 2011/0191299 A1 | 8/2011 | Huynh Huu et al. | |
| 2011/0208785 A1 | 8/2011 | Burke et al. | |
| 2011/0246538 A1 | 10/2011 | Boley et al. | |
| 2011/0307524 A1 | 12/2011 | Aitken et al. | |
| 2012/0179728 A1 | 7/2012 | Harris | |
| 2013/0305287 A1* | 11/2013 | Wong | H04N 21/482 |
| | | | 725/42 |

OTHER PUBLICATIONS ip.com et al.; "System and Method to Automate Setup of a Replication System for Rolling Upgrade Scenario With Schema Changes ", IPCOM000225080D, Jan. 23, 2013, pp. 1-5.

Devart et al.; "Tracking Database Schema Changes", Guidelines on Database Versioning Using Devart Tools, Devart 2010, pp. 1-10.

Adam et al.; "Detecting Data and Schema Changes in Scientific Documents", IEEE Advances in Digital Libraries, Proceedings, May 22-24, 2000, pp. 160-170.

IBM developerWorks, "DB2 Tools corner: Introducing the IBM-supported batch interface for change management in DB2 Administration Tool for z/OS V10.1 and DB2 Object Comparison Tool for z/OS V10.1" http://www.ibm.com/developerworks/data/library/techarticle/dm-1205toolscorner/index.html?ca=dat, May 10, 2012.

* cited by examiner

TECHNOLOGY FOR IMPORTING SCHEMA CHANGES TO MULTIPLE TARGET SYSTEMS

FIELD OF THE INVENTION

The present invention relates to technology for applying a change statement to target databases.

BACKGROUND

In a context of activity such as software development, test and production, administrators keep track of what changes are made, where the changes are made, e.g. to which target systems, and when they are made, e.g., current status of particular changes on particular target systems. This change administration is applicable, for example, to database administrators ("DBA's") of databases, such as, for example DB2, which is database software by IBM Corporation. ("DB2" is a trademark of IBM Corporation.)

SUMMARY

A computer system implemented method for applying a change statement to target databases includes creating a central change identifier and associating the central change identifier and change statement to respective target databases, which includes creating an association identifier for each respective target database. The central change identifier, the change statement and a respective association identifier are provided for sending to each respective target database. A change status is presented that indicates occurrence of a current processing event by a respective target database, which includes showing the change status associated with the central change identifier and the respective target database in response to receiving the change status, the central change identifier and a change statement indicator from the respective target database.

In another aspect, when the change statement indicator received from the target database includes the association identifier for the respective target database, wherein showing the change status associated with the central change identifier and the respective target database includes indicating the change status is associated with the change statement.

In another aspect, when the change statement indicator received from the target database includes the association identifier for the respective target database, receiving the change statement indicator for the respective target database includes receiving both the time stamp and the association identifier for the respective target database.

In another aspect, when the change statement indicator received from the target database includes a time stamp generated upon an initializing event for processing the change statement by the respective target database and not the association identifier for the respective target database, wherein showing the change status associated with the central change identifier and the respective target database includes indicating the change status is associated with a different change statement.

In another aspect, receiving the change status, the central change identifier and the change statement indicator includes receiving the change status, the central change identifier and the change statement indicator from a target database that is on a remote system.

In another aspect, showing the change status associated with the central change identifier and the respective target database includes selecting a change status received from the target database for a processing event that occurred after the initializing event.

In another aspect, providing the central change identifier, the change statement and the respective association identifier for sending to each respective target database includes sending the central change identifier, the change statement and the respective association identifier via network communication to a distributed relational database architecture compliant target database for automatic processing by the target database.

Other embodiments of the invention are disclosed and claimed, including a computer system implementation and a computer program product.

BRIEF DESCRIPTION OF DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION

A centralized view is provided for change activity happening across multiple target locations, which includes tracking of status and other information about respective changes throughout their life cycles, according to embodiments of the present invention. (A change "life" or "life cycle" refers to stages of implementing the change.) "MT Central" or "multi-target central system" refers herein to a database instance or subsystem from which a DBA sends changes to the targets and to which status and other aspects of the changes are reported throughout the lives of the changes. A schema defines structure of database objects. A database subsystem to which an administrator may send a database schema change may be referred to herein as a "target," "target location," "target subsystem" or "target system."

Tools disclosed herein enable specifying a name for a group of targets and specifying the targets included in the named target group, according to embodiments of the present invention. Once this has been specified, changes may then be sent to all the targets in the target group by indicating the target name, so that the targets do not have to be individually enumerated each time changes are sent to the same set of targets.

Figure 4A:
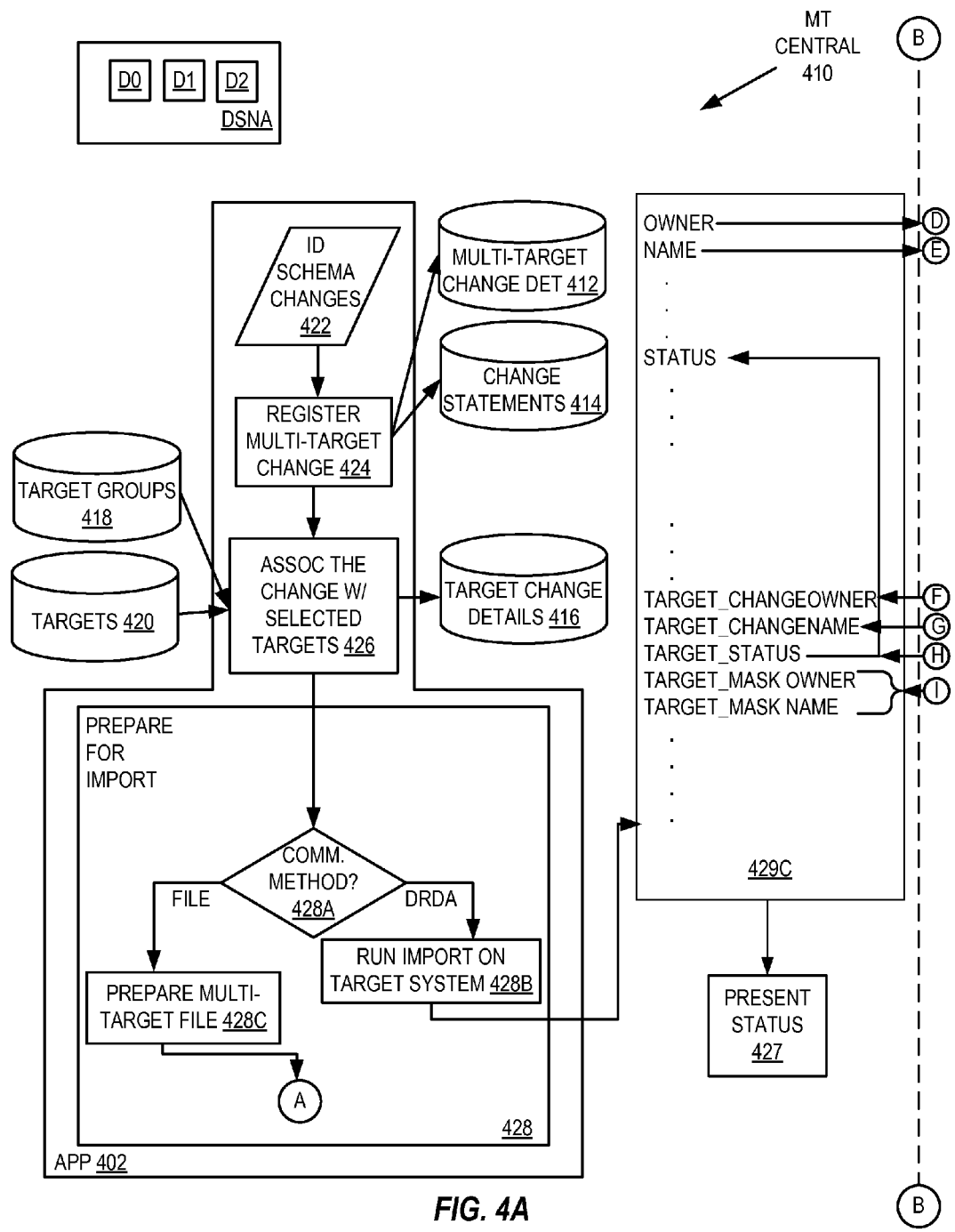
FIGS. 4A and 4B illustrate a method for importing schema changes to multiple target systems, according to embodiments of the present invention.
Figure 4B:
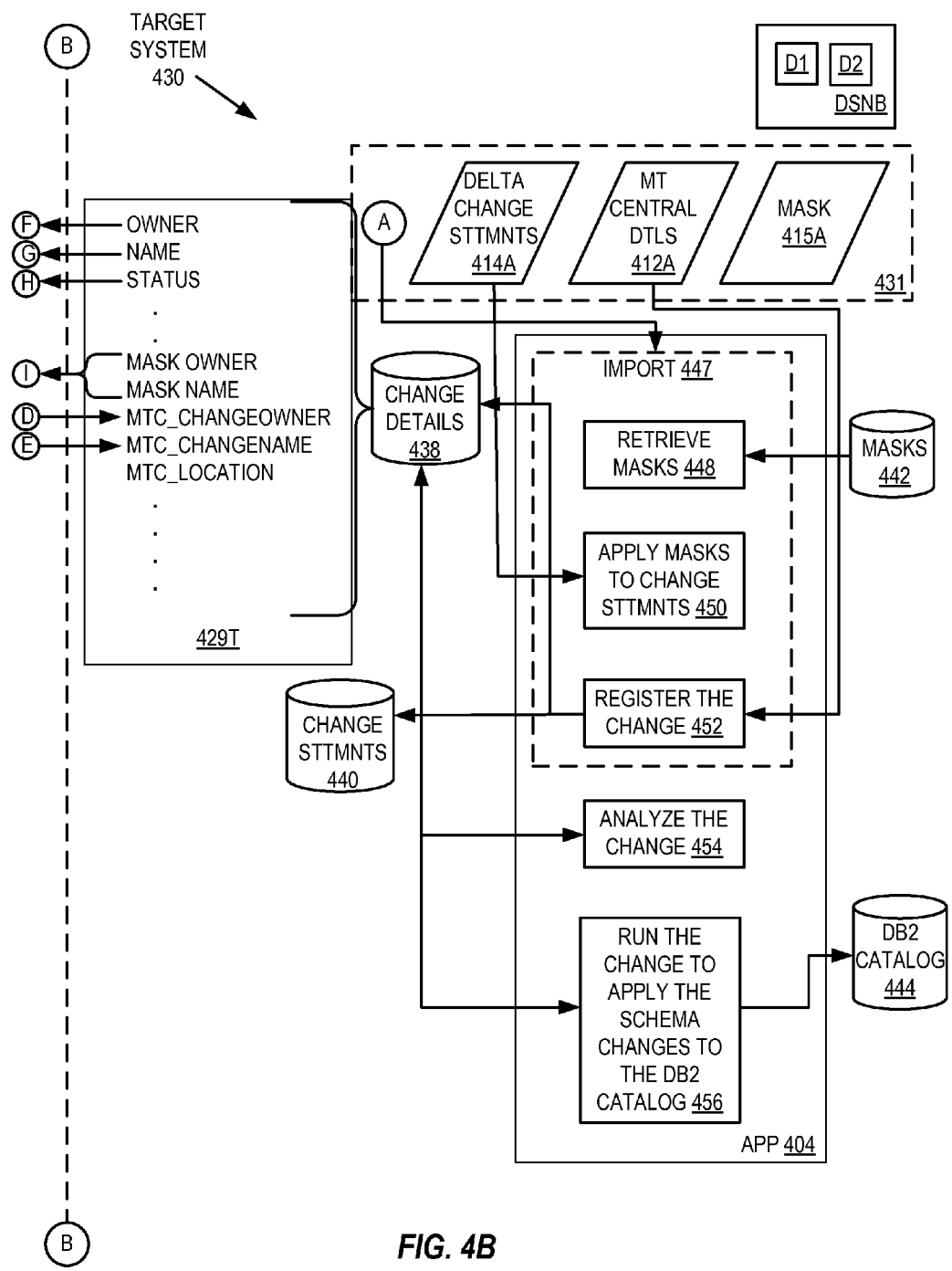

In FIGS. 4A and 4B according to embodiments of the present invention, software program 402 is depicted for MT central 410, which provides functions including configuring and sending database changes and receiving and displaying status updates for the changes. Program 404 is depicted for target system 430, which may be representative of a plurality of targets 430 and is for receiving database changes, implementing the changes and sending status updates back to program 402 on MT central 410.

Programs 402 and 404 present user interfaces by which users may enter information to set up and execute changes. In response to the setup information entered by the user, such as via process 422, 424 and 426, programs 402 or 404 or both build change statements and batch jobs to execute for running the change statements for implementing the database changes. (Herein, the term "applying" and "running" may be used interchangeably for "running" or "applying" changes.) Programs 402 and 404 each communicate with network communication processes that are configured to recognize, by respective identifiers, databases and respective computer systems on which each database runs. FIGS. 4A and 4B also show interactions between programs 402 and 404, according to embodiments.

In general, MT Central 410 as shown in FIG. 4A is a system from which changes are initiated and administered, and it may or may not include target databases. In the following example, changes to model database D0 serve as the source for changes to be made to databases D1 and D2 on both database subsystem DSNA and database subsystem DSNB, i.e., two instances of a target system 430. Thus, database subsystem DSNA on MT Central 410 in this example includes both the source of changes, D0, and also includes target databases, D1 and D2.

In the illustrated embodiments shown in FIGS. 4A and 4B, program 404 runs on a target system 430 and provides processes for importing and applying changes initiated via program 402 on MT Central 410. Where there are target databases on MT Central 410, such as D1 and D2 in the following example, programs 402 and 404 both run on MT Central 410 which is same as target system 430.

Also, a target database may or may not run on the same operating system as MT Central 410. A given target may or may not conform to distributed relational database architecture ("DRDA"), which is a database interoperability standard from The Open Group.

The following example illustrates aspects of how databases are changed, which may be implemented as illustrated in FIGS. 4A and 4B and described herein. In one example below, DB2 subsystems include DSNA, which is on MT central 410, and DSNB, on target system 430. DSNA has a model database, D0, and two additional databases, D1 and D2. DSNB also has databases D1 and D2. In each subsystem, databases D1 and D2 are exact copies of model database D0, except for schema and database names. The following table illustrates this:

TABLE 1

| DB2 subsystem | Database name | Schema name |
|---|---|---|
| DSNA | D0 | SCH0 |
|  | D1 | SCH1 |
|  | D2 | SCH2 |
| DSNB | D1 | SCH1 |
|  | D2 | SCH2 |

To keep the copies synchronized, any change to database model D0 must also be done to databases D1 and D2 on both DSNA and DSNB.

As previously indicated, changes to databases may be done by applying 456 change statement 414 or 440 or both. To generate a change statement, according to one example, a developer checks out the latest definition of database D0 in DDL format. The developer makes DDL file changes and sends the DDL file to the DBA for deploying the changes.

In this example, the DDL file, which was created by the developer, inserts a column C2 in table T1 before column C3 in database D0. The DDL file from the developer includes the following:

```
SET CURRENT SQLID = 'SYSADM';
SET SCHEMA = 'SCH0';
CREATE DATABASE D0;
CREATE TABLE T1
(C1 INT
,C2 INT
,C3 INT)
IN DATABASE D0;
CREATE UNIQUE INDEX IX1_T1
ON T1 (C1);
```

Returning to the matter of generating a change statement 414, which is part of identification process 422, for the DDL file that was sent by the developer, the DBA compares the file to the model database D0 on DSNA to identify 422 schema and other changes. Accordingly, a schema change defines a change to the structure of one or more database objects. This comparison may be done by program 402 invoking a DB2 Object Comparison Tool, which generates i) a change statement 414, also referred to as a "delta change statement," and ii) a report that describes each change to an object. The change statement records the essence of the change.

For the above example, the DB2 Object Comparison Tool finds the DDL file for changing database D0 and generates a change statement that includes the following:

```
ADMIN ALTER TABLE SCH0.T1 INSERT "C2" INTEGER DEFAULT
NULL BEFORE C3;
```

In a later process 456, the change statement generated for D0 may also be applied to other databases D1 and D2, but it must be altered, since D1 and D2 may be different than D0 in some ways, including having schema and database names. One way of altering the application at 456 of the D0 change statement for changing D1, for example, is by processing 456 the D0 change statement along with a mask 442 that defines differences in how the D0 change statement is applied to make corresponding changes to D1, which is based on how objects in the source database differ from corresponding objects in the target.

In FIG. 44B, masks 442 are shown in connection with target system 430 and its DNSB instances of databases D1 and D2, for example. Likewise, importing 447, analyzing 454 and running 456 are shown as done by program 404 in connection with target system 430. However, it should be understood that for changes to database subsystem DNSA's databases D1 and D2, which are on MT Central system 410, there may also be masks 442 on system 410 since it is a target system for these databases, and program 402 may execute steps of importing 447, analyzing 454 and running 456, etc. for these databases.

The following table illustrates a mask for the example of source database D0 and target database D1:

| Mask type | From | To |
|---|---|---|
| Database name | D0 | D1 |
| Schema name | SCH0 | SCH1 |

The following syntax shows an exemplary syntax to describe the masking of this example:

```
DBNAME: D0, D1
SCHEMA: SCH0, SCH1
```

In order to change database D1, for example, the above mask will be eventually applied 450 along with the D0 change statement. By applying the mask to the D0 change statement, this changes the database name D0 in the change statement to D1 and the schema name SCH1 for database D0 so that the schema name is SCH1 for database D1. In other respects, the changes specified by the D0 change statement will be applied 450 for changing database D1.

Before applying 450 masks 442, additional setup is done. The user registers 424 the change or set of changes in a way that identifies it by name, owner and where the change is coming from, which indicates where to return reports indicating status. For example, program 402 presents the user with a data input screen or set of data input screens that prompts the user to register the change or set of changes by entering a name and owner. The user enters where the change is coming from, which in the illustrated instance is DSNA, decides on a name for the change or set of changes and enters the change name in the name field, which is "MTC Change" in the illustrated instance. If the user is the owner, the user responsively enters their own userid in the owner field. If another person is the owner, the user responsively enters the other person's userid in the owner field. For example, the user may enter "Vijaya" for the owner field.

The following is an example of at least some content that program 402 receives from a user and stores as multi-target change data 412 for MT Central registration 424, according to embodiments of the present invention:

```
CENTRAL CHANGE DETAILS:
    DB: DSNA
    CHANGE OWNER: VIJAYA
    CHANGE NAME: MTC CHANGE
```

For registration 424, the user also defines and stores target profile data 420, such as by interacting with data entry screens presented by program 402. The user may also define and store target group data 418 via program 402, which lists each target in a set of targets and indicates a name for the set, so that a change may be sent to all the targets in the set by merely invoking the group name. For a different set of changes than indicated in the example herein above, the following are examples of at least some data included in target profiles 420 and target groups 418, according to embodiments of the present invention.

```
TARGET PROFILES:
    DB LOCATION: DSN9
    COMM. METHOD: FILE
    MASK OWNER AT TARGET:
    MASK NAME AT TARGET:
    :
    DB LOCATION: DSNB
    COMM. METHOD: DRDA
```
-continued
```
    MASK OWNER AT TARGET: VIJAYA
    MASK NAME AT TARGET: MASKB
TARGET GROUPS:
    GROUP NAME: TGT_GROUP
    TARGETS: DSNB_DRDA, DSN9_FILE
```

Masks are identified for DSNB and not identified for DSN9 in the above target profiles 420. This is because in this example DSNB has DRDA communication and DSN9 does not. For each database subsystem that has DRDA connectivity to MT Central 410, program 402 at MT Central 410 may communicate with program 404 at target system 430 to automatically import the job, which is at process 428 in FIG. 4A.

For target DSNB in the present example, which does have DRDA connectivity to DSNA, a mask name must be specified in the target profile 420 for automatic importing 428B from masks 442 that already exist at target 430.

In non-DRDA cases, since importing is deferred until after process 428, specification of a mask may be also deferred, so that the target profile 420 for a non-DRDA communicating target 430 does not require a mask name.

The following is an example mask 442:

```
MASK:
    TARGET: DSN9
    MASK NAME: MASK9
    MASK OWNER: VIJAYA
    MASK DEFINITION ON TARGET SYSTEM:
        DBNAME: D0, D1
        SCHEMA: SCH0, SCH1
```

In association process 426, the user associates the change with targets. That is, for specifying what changes to what targets are associated with the registered change, program 402 presents the user with a data input screen or screen set that prompts the user for additional information. According to embodiments of the present invention, the input screen includes i) a field for identifying a particular one or more of the defined target groups, ii) a field for identifying a particular one or more of the target locations (in case a target group has not been defined, or else for entering one or more targets in addition to targets in the one or more target groups) and iii) a field for the owner's userID.

In this example, the user is configuring MT Central 410, via program 402, to send, as part of the MTC Change, a schema change to two target systems 430 identified in target group TGT_GROUP. So the user enters this identifier in the target location field. In this example, the user enters userID "Vijaya," as before, to indicate that Vijaya is the owner of the one or more changes being sent to target system DSNB. The following is an example of at least some content included in target change details data 416 for target registration 426, according to embodiments of the present invention:

```
TARGET CHANGE DETAILS:
    OWNER: VIJAYA
    TARGET GROUP NAME: TGT_GROUP
```

Target group TGT_GROUP specifies DSNB and DSN9 as targets, in the above described example. The following provides an expanded example of data included in target change details 416, according to embodiments of the present invention:

```
EXPANDED TARGET CHANGE DETAILS:
    OWNER: VIJAYA
    TARGET NAME: DSNB_DRDA
    DB LOCATION: DSNB
    CHANGE NAME (FOR TARGET): CHANGE 1
    COMM. METHOD: DRDA
    MASK OWNER AT TARGET: VIJAYA
    MASK NAME AT TARGET: MASK B
    :
    TARGET NAME: DSN9_FILE
    DB LOCATION: DSN9
    OWNER: VIJAYA
    CHANGE NAME (FOR TARGET): CHANGE 2
    COMM. METHOD: FILE
    MASK OWNER AT TARGET:
    MASK NAME AT TARGET:
```

Program 402 may automatically provide target names and locations in target change details 416 above by looking up targets 430 in a target group profile 418 named for the change.

The above example illustrates that data is included in target change details 416 to identify a name for the change on each target system 430, by which name the particular target system 430 will identify the one or more schema changes. In this example, the user decides on "Change 1" as a name for the one or more schema changes on target system DSNB that the user wishes to include in the multi-target MTC Change. So the user enters "Change 1" in the name field. (Alternatively, application 402 may generate the change name for the target automatically and may allow the user to override the automatically generated name. Also, if there is no DRDA connectivity, a user at 430 may generate a change name for a target as part of registration process 452 at target 430.) Consequently, in communication between MT Central 410 and target system DSNB, MT Central 410 will identify this change or set of changes to DSNB as "Change 1." Likewise, DSNB will include this name in its communication back to MT central 410 about the change.

In association process 426, the user may indicate an additional target to include in the multi-target MTC Change via the above described association-related data entry screen. For this purpose, the data entry screen includes a way to add another target, such as a line for entering a command or a GUI object to select for this.

At process 428A, program 402 chooses 428A which actions to take, depending upon user input indicating specified method of communication for each target 430. For non-DRDA communication, at process 428C program 402 generates a change file based on the above described data entry, for which a user generates a job for importing of the file via application 404 or otherwise imports the file. For DRDA communication, at process 428B program 402 generates the change file and a job based on the above described data entry. Also, program 402 causes program 404 to actually remotely import the job at target 430 via network communication with program 404. If process 428B is not successful in causing remote import, such as due to loss of DRDA connectivity, a user generates a job for importing the change file generated at 428B, which the user may do via application 404. For non-DRDA communication, a DBA at MT Central 410 may send the change file to target system 430 via non-DRDA network communication.

The following is an example of a change file created by process 428D, according to embodiments of the present invention:

```
CHANGE FILE:
    FILE NAME: VIJAYA.CMBAT1.MTC
    DB LOCATION: DSNA
    CHANGE ID: 4024
    OWNER: VIJAYA
    CHANGE NAME (FOR CENTRAL): MTC CHANGE
    :
    TARGET LOCATION: DSN9
    ASSOCIATED ID: [DATE TIME STAMP]
    CHANGE NAME (FOR TARGET): CHANGE 2
    :
    CHANGE STATEMENT: ADMIN ALTER TABLE SCH0.T1
    INSERT "C2" INTEGER DEFAULT NULL BEFORE C3;
```

For importing 447 a change at target 430, MT Central sends target 430 information 431 including a set of MT Central change data 412A, change statement 414A and mask name and owner specification 415A, which points to a mask 442 in storage that is accessible to target 430. This information 431 sent to target 430 for the change job will include MT central data 412A, one or more of change statement 414A and corresponding mask pointer 415A, all of which may be included in a change file. During import process 447, program 404 may override mask pointer 415A via process 448.

Once the imported change is registered 452 on target 430, it is like any other regular change, and program 404 may analyze 454 and run 456 the change to apply it to target catalog 444.

Once imported 447 at target system 430, MT central 410 receives status updates about the change from target 430, and presents the updates to the user, as illustrated in FIGS. 4A and 4B by communication 429. Identification of which change the status communication 429 describes is facilitated by registration 452 while importing 447 the change file, wherein program 404 stores at 438 a unique identifier for the change on target system 430 by a target change name and owner combination, such as described herein above regarding Change 1 and Vijaya in expanded target change details 438, for example. That is, program 404 generates a target identifier for the update (or uses one generated by program 402) and stores it for use in communication 429 of status updates for the change back to MT Central 410.

Registration 452 also includes program 404 storing MT Central change data 412 received from MT Central 410, wherein program 404 also uses this in communication 429 of status updates for the change back to MT Central 410. When MT central 410 receives a status communication 429 update, MT Central 410 recognizes it due to stored MT Central change data 412, target change details 416 and registration 424 and association process 426 performed by program 402 to prepare the change for sending.

The sending of status and identifying information as described herein by target 430 back to MT Central target 430 may occur at various phases during the lifecycle of the target change, which may include automatic sending of status indicators to MT Central 410 responsive to predefined triggers if there is DRDA connectivity to MT Central 410. In other cases, target 430 program 404 generates and sends 429 a file to MT Central for processing. Such communication 429 may contain the following details for synchronizing between target system 430 and MT Central 410.

For a change sent by MT Central 410 to target 430, a user may revise parameters, such as a change name, for example. Consequently, identifiers that are not subject to change are also generated by programs 402 and 404 for sending in communication 429.

A central change identifier is one type of fixed identifier and is generated by program 402 for each multi-target change. It may be generated responsive to the user's initially specified multi-target change name and owner, according to embodiments of the present invention. Another type of fixed identifier that is generated by program 402 is referred to as association identifiers, which is because each one is associated with a respective one of the database systems that is subject to a multi-target change initiated by MT Central 410. The association identifiers have the following format:

<C or T><creation timestamp>
C: If the association happens on central system.
T: If the association happens on target system.
Creation timestamp: Timestamp of the association—on central system 410 or target system 430.

To understand association identifier structure and processes of generating association identifiers and communicating therewith, consider examples illustrated in the following Tables, wherein a change is prepared in processes 422, 424, and 426 and then deployment is initiated by process 428 on central system 410. In this example, the multi-target change is initiated and monitored from central system DNSA and is for two target systems DSNB and DSN9. The central change identifier "1000," in the example, which applies to the set of targets DSNB and DSN9, is generated by program 402 and then associated by program 402 with the central change name created by the user. It is included in multi-target change detail 412.

At the time of completing association for each change, process 426 generates an association identifier for the change to target DSNB, C2013-10-10-09.00.08.781444, as shown in Row#1 of Table 2, and an association identifier for the change to target DSN9, C2013-10-10-09.00.09.102543, as shown in Row#2. Initially, the status for the change is "NEW" on central system 410, as shown in Table 2. Mask names that are used on the targets are also shown in Table 2.

the corresponding change is shown on DSNA's Table 2, Row#1. When this information is sent by DSNA in communication process 429, it includes tags for the change indicating it is one of the changes originated by central change identifier 1000 and, in particular, that it is the C2013-10-10-09.00.08.781444 one of those changes. Table 3 presents status on DSNB for this change that indicates the change is successfully registered 452 using mask B, where successful registration status is indicated by the term "defined."

Table 3 also shows that another change (in the row labelled "Row#3) is also imported on DSNB using a different mask labeled "Mask 2B". In this example, this change shown in Row#3 was initiated by a user at DSNB and the DSNB user associated the with the multi-target change initiated by MT Central 410 having central change identifier 1000. Since the change on DSNB shown in Row#3 of Table 3 was not initiated by central system DSNA, it is not yet associated with central system DSNA yet in Table 3. At this point in time shown in Table 3, the change status shows this change has been through the analyze process 454 on target system DSNB. The 2013-10-10-09.02.07.781466 time stamp shown in Row#3 of Table 3 was created by registration process 452 when the DSNB user associated the change with central change 1000.

(It should be understood that according to embodiments of the present invention, association process 426 of central system 410 may be included in registration process 424 of program 402, unlike what is illustrated in FIG. 4. Conversely, an association process is included in registration process 452 of program 404 on target system 430 according to embodiments of the present invention, but may instead be a separate process according to alternative embodiments.)

From the above, it may be understood that program 404 creates an association of the central system change identifier "1000" to the change statement for the remote database subsystem DSNB database and sends the central system change identifier "1000" and identification of the remote computer system's database subsystem DSNB back to the central computer system 410 that runs database subsystem DSNA, along with sending the other data shown in the row labelled Row#3 in Table 4 below, including the target time stamp 2013-10-10-09.02.07.781466.

An association ID is not shown in Table 3 for this change, which is intentional according to one or more embodiments of the present invention. However, the 2013-10-10-09.02.07.781466 time stamp was created by the target

TABLE 2

(At DSNA)

| | Central Change ID | Association ID | Central Association Timestamp | Target Location | Target Change Name | Target Mask Name | Target Status | Target Create - Timestamp |
|---|---|---|---|---|---|---|---|---|
| Row #1 | 1000 | C2013-10-10-09.00.08.781444 | 2013-10-10-09.00.08.781444 | DSNB | Change 1 | Mask B | NEW | |
| Row #2 | 1000 | C2013-10-10-09.00.09.102543 | 2013-10-10-09.00.09.102543 | DSN9 | Change 2 | | NEW | |

Table 3 below, which shows status of changes on target DSNB, indicates in Row#1 information for the change that was sent by DSNA in communication 429 to DSNB, where DSNB, so that DSNB could alternatively show the T2013-10-10-09.02.07.781466 ID in Table 3 when program 404 registered 452 the change.

TABLE 3

(At DSNB)

| Target Location | Target ChangeID | Target Change Name | Target Mask Name | Target Status | Target Create - Timestamp | Association ID | |
|---|---|---|---|---|---|---|---|
| DSNB | 40 | Change 1 | Mask B | Defined | 2013-10-10-09.01.08.892341 | C2013-10-10-09.00.08.781444 | Row#1 |
| DSNB | 41 | Change 1a | Mask 2B | Analyzed | 2013-10-10-09.02.07.781466 | | Row#3 |

Table 4 below shows change status as presented on central system DSNA after receiving updates communicated 429 from DSNB for the transaction tagged with central change identifier 1000 and association identifier C2013-10-10-09.00.08.781444. Communication 429 includes those two identifiers, the target location, the target change identifier, the target mask name, the target change status and the time stamp indicating when the target DSNB registered the change, which indicates a target creation time for the change, all of which are as shown in Row#1 of Table 4 below.

By including the association identifier of Table 4, Row#1, in the communication along with the "Defined" change status and central change identifier 1000 sent from DSNB, the association identifier provides a change statement indicator indicating to DSNA that the "Defined" change status (shown in the "Target Status" column of Table 4, Row#1) signifies that the change statement of central change identifier 1000 sent by DSNA to DSNB has been registered by DSNB, and signifies that DSNA should show the "Defined" change status in that Row#1 in place of the previous change status until a later time stamped change status is received for the same association identifier and central change identifier. The target creation time stamp 2013-10-10-09.01.08.892341 is also included in the communication from DSNB related to Row#1 of Table 4, which DSNB indicates to DSNA that DSNB has registered the change statement.

The new transaction indicated on target DSNB in Row#3 of Table 3 above is indicated in the row labelled Row#3 of Table 4 below, showing that communication process 429 of 09.02.07.781466, indicating that this change was initiated on target DSNB, instead of central system DSNA.

By omitting the association identifier in the communication from DSNB related to Row#3 of Table 4, this provides a change statement indicator indicating to DSNA that the change status received from DSNB with the central change identifier 1000 and target creation time stamp 2013-10-10-09.02.07.781466 is for a different change statement than the change statement that was sent with central change identifier 1000 by DSNA to DSNB. Although the change statement indicator indicates the change statement is different, DSNB indicates to DSNA by the target creation time stamp that DSNB has registered the different change statement and indicates by the central change identifier 1000 that DSNA should present the accompanying change status with the central change identifier 1000. In the illustrated instance, DSNB included another time stamp (not shown in Table 4) with the change status "Analyzed" in the communication to DSNA, and the other time stamp indicates a later time than the target creation time stamp shown in the last column of Row#3. This indicates to DSNA that the analysis processing event indicated by its accompanying change status occurred after the registration processing event at DSNB, so that the "Analyzed" change status should be shown in Table 4 instead of "Defined."

Table 4 below is shown before receiving a status update from DSN9 for central change identifier 1000, C2013-10-10-09.00.09.102543, so Row#2 is unchanged in comparison to initial Table 2 above.

TABLE 4

(At DSNA)

| | Central Change ID | Association ID | Central Association Timestamp | Target Location | Target Change Name | Target Mask Name | Target Status | Target Create - Timestamp |
|---|---|---|---|---|---|---|---|---|
| Row#1 | 1000 | C2013-10-10-09.00.08.781444 | 2013-10-10-09.00.08.781444 | DSNB | Change 1 | Mask B | Defined | 2013-10-10-09.01.08.892341 |
| Row#3 | 1000 | T2013-10-10-09.02.07.781466 | | DSNB | Change 1a | Mask 2B | Analyzed | 2013-10-10-09.02.07.781466 |
| Row#2 | 1000 | C2013-10-10-09.00.09.102543 | 2013-10-10-09.00.09.102543 | DSN9 | Change 2 | | NEW | | target DSNB sent 429 communication process 429 of DSNA the following for this transaction: the central change identifier 1000, the target location DSNB, and set up information created for the change by user at DSNB via application 404, including the name of the change on the target, i.e., target change name Change 2, the target mask name Mask 2B, and the 2013-10-10-09.02.07.781466 time stamp created when the DSNB user completed registration 452 of the change via program 404, which included associating the change with central change 1000. Table 4 shows communication process 429 of program 402 has generated an association ID by adding a "T" to the received time stamp 2013-10-10-

Table 5 below, which shows status of changes on target DSN9, indicates in the row labelled Row#2 information for the change sent in communication 429 to DSN9 as shown on Row#2 of Table 2. Communication process 429 includes in communication 429 tags indicating the change is one of the changes originated by central change identifier 1000, i.e., this particular one of those changes is C2013-10-10-09.00.09.102543. Table 5 presents status on DSN9 for this change that indicates the change is successfully registered 452 at the time of the target time stamp using Mask 9, where successful registration status is again indicated by the term "defined."

TABLE 5

(At DSN9)

| Target Location | Target ChangeID | Target Change Name | Target Mask Name | Target Status | Target Create - Timestamp | Association ID | |
|---|---|---|---|---|---|---|---|
| DSN9 | 1020 | Change 2 | Mask 9 | Defined | 2013-10-10-09.05.08.749205 | C2013-10-10-09.00.09.102543 | Row#2 |

Table 6 below shows change status as presented on central system DSNA after receiving an additional update communicated 429 from DSN9 for the transaction tagged with central change identifier 1000 and central association ID C2013-10-10-09.00.09.102543. No additional updates since Table 4 above have been received at this time. Communication 429 from DSN9 to DSNA includes those two identifiers, the target location, the target change name, the target mask name, the target status and the time stamp indicating when the target DSN9 registered the change, as shown in Row#2 in Table 6 below.

TABLE 6

(At DSNA)

| | Central Change ID | Association ID | Central Association Timestamp | Target Location | Target Change Name | Target Mask Name | Target Status | Target Create - Timestamp |
|---|---|---|---|---|---|---|---|---|
| Row#1 | 1000 | C2013-10-10-09.00.08.781444 | 2013-10-10-09.00.08.781444 | DSNB | Change 1 | Mask B | Defined | 2013-10-10-09.01.08.892341 |
| Row#3 | 1000 | T2013-10-10-09.02.07.781466 | | DSNB | Change 1a | Mask 2B | Analyzed | 2013-10-10-09.02.07.781466 |
| Row#2 | 1000 | C2013-10-10-09.00.09.102543 | 2013-10-10-09.00.09.102543 | DSN9 | Change 2 | Mask 9 | Defined | 2013-10-10-09.05.08.749205 |

Table 7 below indicates further updates to existing changes on target system DSNB. In particular, Table 7 shows that Change 1 on target system DSNB is now canceled.

TABLE 7

(At DSNB)

| Target Location | Target Change ID | Target Change Name | Target Mask Name | Target Status | Target Create - Timestamp | Association ID | |
|---|---|---|---|---|---|---|---|
| DSNB | 40 | Change 1 | Mask B | Cancelled | 2013-10-10-09.01.08.892341 | C2013-10-10-09.00.08.781444 | Row#1 |

Table 8 below indicates at central system DSNA further updates to existing changes, wherein updates from DSNB and DSND have been processed. In particular, Row#1 indicates a status change from DSNB system and Row#4 indicates a status change from DSND system.

TABLE 8

(At DSNA)

| | Central Change ID | Association ID | Central Association Timestamp | Target Location | Target Change Name | Target Mask Name | Target Status | Target Create - Timestamp |
|---|---|---|---|---|---|---|---|---|
| Row#1 | 1000 | C2013-10-10-09.00.08.781444 | 2013-10-10-09.00.08.781444 | DSNB | Change 1 | Mask B | Canceled | 2013-10-10-09.01.08.892341 |
| Row#3 | 1000 | T2013-10-10-09.02.07.781466 | | DSNB | Change 1a | Mask 2B | Analyzed | 2013-10-10-09.02.07.781466 |
| Row#2 | 1000 | C2013-10-10-09.00.09.102543 | 2013-10-10-09.00.09.102543 | DSN9 | Change 2 | Mask 9 | Defined | 2013-10-10-09.05.08.749205 |
| Row#4 | 1000 | T2013-10-11-09.05.08.785390 | | DSND | Change 3 | Mask D | Analyzed | 2013-10-11-09.05.08.785390 |

The following relates some aspects of processes for programs 402 and 404, as shown in FIGS. 4A and 4B, to the example transactions described herein above, according to embodiments of the present invention. At 422, program 402 on central system 410 creates or receives one or more change statements. At 424, program 402 creates a multi-target change name.

At 426, program 402 creates an association of the multi-target name, the one or more change statements, a target location, and a mask 442, where mask 442 exists at target location 430 and is for application with the change statement to the target database at the specified target location 430, wherein application of the change statement provides a change to the target database.

At 426, program 402 allows the user to provide a target change name for the change to the target database, which is an alternative name for the change, i.e., a name by which the target system refers to the change and that may be presented to a local user on the target system. Alternatively, when the target name is not provided by program 402 on MT central, program 404 on target system generates the target change name, which may be responsive to user input to program 404. The associating at 426 includes the computer system creating an association identifier for the association. Table 2, Row#1, illustrates an example of this, where the association identifier is "02013-10-10-09.00.08.781444" for the change to DSNB. From this example, it should be appreciated that when program 402 automatically creates the association identifier for each association, program 402 creates a time stamp, such as 2013-10-10-09.00.08.781444 for registration of the change to DSNB, and incorporates the time stamp into the association identifier C2013-10-10-09.00.08.781444 by adding the prefix "C" to the time stamp.

At 426, program 402 may receive input from the user for another target database, in which case program 402 creates a second association, where this one associates the multi-target name and one or more change statements with a second mask and target location for a second target database. Also, the computer system creates a second central system association identifier for the second association. Table 2, Row#2, illustrates an example of this, where the central system association identifier is "02013-10-10-09.00.09.102543" for the change to DSN9.

At 428, program 402 sends the one or more change statements to each respective target database with the respective one of the central system identifiers and mask pointer. Table 2 above provides an example in Row#1 and Row#2.

In a parallel process 427 for presenting status updates at MT Central 410, as depicted by the above Tables 2 through 8, process 427 of program 402 receives a status update about remote processing of the change for the target databases, wherein each update includes its central association identifier. Table 4 above provides an example, wherein it should be understood that the received update from DSNB that is depicted by Row#1 included the central system association identifier shown in column 3 of Row#1. Also in the parallel process, program 402 presents 427 such a status update, which it shows in association with its multi-target change identifier. The update presenting 427 is responsive to receiving, such as via network communication 429, status update information including the update's association identifier and the multi-target change identifier, i.e., central change identifier, which is what allows program 402 to recognize the association and show the update in association with its multi-target change identifier. Each received status update also includes a target registration time stamp indicating when the change was registered at target system 430, i.e., also referred to as "created" or "defined," by an instance of program 404 for its respective target database. Again, Table 4 above provides an example, wherein it should be understood that the received update from DSNB that is depicted by Row#1 included the target time stamp shown in the last column of Row#1, which was created by program 404 on the computer system that runs DSNB.

It should also be understood that events that occur in processing a change at a target system, include events in addition to registration, such as analyzing and running the change, for example. Correspondingly, status information received for each one of the updates indicates a registered, analyzed or applied status and a time stamp indicating when the update event occurred at the target system. However, the target registration time stamp is sent back to MT Central with each status update, even for events after the target registration event, and does not change from that of the target registration time stamp that the target originally created upon registering, i.e., defining, the change at the target, according to embodiments of the present invention. Thus, when a target system analyzes a change, for example, it sends the MT Central system a time stamp back indicating when the analysis event occurred and also sends the original target registration time stamp.

Referring to Table 4, Row#3, for example, the last column presents the target registration time stamp received by DSNA from DSNB, which indicates when DSNB registered this row's change. The penultimate column, however, shows that DSNB has analyzed the change, which is a processing event DSNB performed after DSNB registered the change. Although the time at which DSNB performed the analysis event for this change is not shown in Table 4, it should be understood that in communication 429H of FIG. 4B from DSNB (as target system 430) to DSNA (as MT Central 410), DSNB included a time stamp that DSNB generated upon the DSNB analysis event for this change, which was in addition to other communication 429 that DSNB sent to DSNA for the analysis event, including the MT Central change identifier (shown in column 2 of Table 4), association identifier (shown in column 3) and target registration time stamp (shown in last column). By including the latest processing event's time stamp for the change in target system 430 communication 429 for each update, this enables process 427 to select the latest status indication from the target for presenting, by comparing the event time stamps received from the target for the change, even if MT Central 410 processes those status update communications 429 out of order.

As shown in Table 3 Row#3 for DSNB, for example, an instance of program 404 on one of the target computer systems 430 may independently import a change at 447, i.e., a different change statement than the one or more change statements sent by MT Central 410, but may associate at 452 its change to one sent by MT Central 410. Likewise, program 404 may independently apply the same one or more change statements sent by MT Central 410 to a different target database than indicated by the change sent by MT Central 410 on target computer system 430 and may associate the change to the one sent by MT Central 410. When this is done, the remote computer system 430 sends to MT Central 410 for the association:

the central system change identifier, e.g., "1000" in the examples illustrated in Tables 2 through 8;

identification of the remote computer system's database subsystem, e.g., DSNB for the example shown in Table 3 Row#3;

a target time stamp generated by the target's program 404 at the time when the target program 404 registers the change; and other information as indicated in Table 3, Row#3, for example.

For the presenting of status updates, program 402 receives the above described information sent by target system 430. As part of the presenting process illustrated in Table 2 through Table 8, for received status updates that do not already have an association identifier that was created by MT Central 410, such as in the example at Table 3, Row#3, program 402 creates an association identifier by adding a prefix "T" to the received target registration time stamp, which indicates that the association was initiated by the target instead of by the central system. That is, when MT Central receives a time stamp, a "registered" status update and an MT Central change identifier, where the time stamp does not include a "C" prefix, MT Central recognizes this as a change initiated by the target system that the user at the target system wants associated with the MT Central change.

In the foregoing, update information has been described that is primarily about the status. However, status update information may also include updates to other target information besides status.

Figure 5:
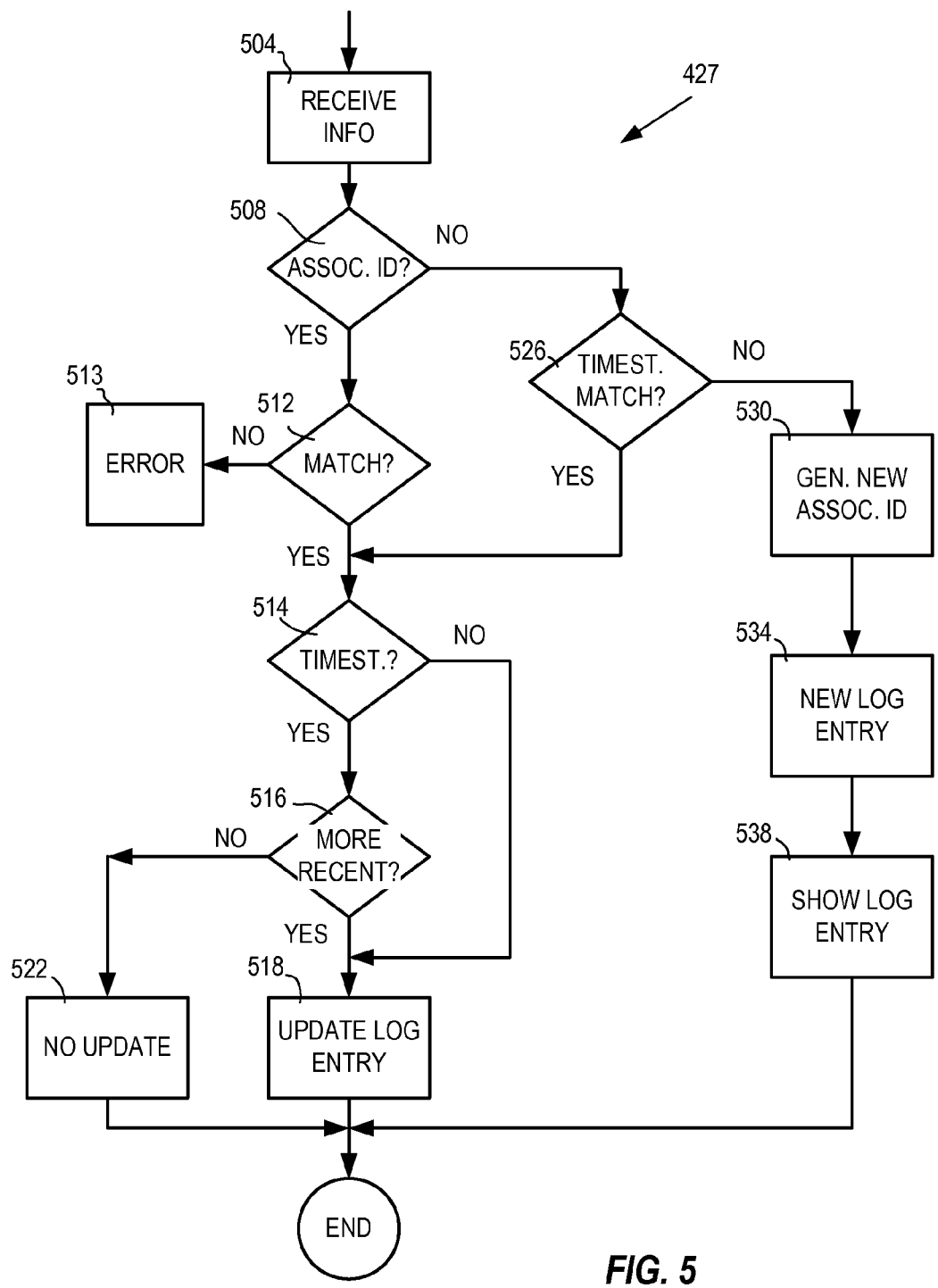
FIG. 5 illustrates details of a central computer system presenting change status, according to embodiments of the present invention.

Referring now to FIG. 5, certain details are illustrated for a central computer system presenting change status regarding changes sent by the central computer system to more than one target database, according to embodiments of the present invention as shown in Tables 2 through 8 herein above. At 504, process 427 receives information from a target database about processing of a change by the target database, wherein the information includes a change status, central change identifier and creation timestamp for a creation processing event of the target database, which may also be referred to herein as a registration event and, correspondingly, a registration time stamp, or referred to as a definition event and, correspondingly, a defined time stamp, or referred to as an initialization event and, correspondingly, an initialization timestamp.

At 508, process 427 determines whether the information received at 504 includes an association identifier, which provides a change statement indicator as described herein above in connection with Table 4 that signifies the communication is for target database processing of a change statement that was earlier sent to the target by the central computer system. If process 427 determines the information received at 504 does include an association identifier, process 427 proceeds to 512, where it determines whether the received association identifier matches an association identifier that was sent by the central system for the same central change identifier. If yes at 512, process 427 determines at 514 whether the information received at 504 includes a time stamp for another processing event of the target database, that is, in addition to the creation timestamp generated by the target database. Likewise, if process 427 determines at 512 that the information received at 504 does not include a time stamp for another processing event of the target database, then process 427 branches at 512 to error 513.

If yes at 514, process 427 determines at 516 whether the other timestamp received at 504 is more recent than a target database processing event timestamp that is associated with a change status currently shown in a log entry for the same association identifier and central change identifier that were received at 504. If yes at 516, process 427 updates the log entry to show at 518 the currently received change status, i.e., received at 504, which includes associating the other timestamp (i.e., other than the target creation time stamp) with the new change status now shown in the log entry, since the other time stamp received at 504 is for the more recent target database processing event. Then process 427 ends until another set of information is received at 504.

Likewise, if process 427 determines at 514 that the information received at 504 does not include a time stamp for another processing event of the target database, then process 427 branches at 514 to 518 and updates the log entry to show the currently received change status.

If process 427 determines at 516 the other timestamp received at 504 is NOT more recent than the target database processing event timestamp that is associated with the change status currently shown in the log entry for the same association identifier and central change identifier that were received at 504, this indicates the log entry already shows a more recent change status, so process 427 does NOT update the log entry 522 and ends until another set of information is received at 504.

If process 427 determines at 508 the information received at 504 does NOT include an association identifier, this omission provides a change statement indicator signifying registration of a new change statement as herein described in connection with Table 4, and process 427 branches to 526 where it determines whether the target creation timestamp received at 504 matches an association identifier for the same central change identifier currently shown in a change status log entry. If process 427 determines at 526 that the target creation timestamp received at 504 matches, this indicates a change status has been received for this new change statement before, and process 427 branches to 514. If process 427 determines at 526 that the received target creation timestamp does not match, then it branches to 530, where it generates a new association identifier using the target creation timestamp received at 504.

Then process 427 proceeds to 534, where it generates a new log entry for the currently received change status, which includes associating the target creation time stamp with the change status shown in new the log entry. Then process 427 proceeds to 538, where it shows the new log entry associated with the central change identifier and target database of the currently received change status. Then process 427 ends until another set of information is received 504.

Figure 1:
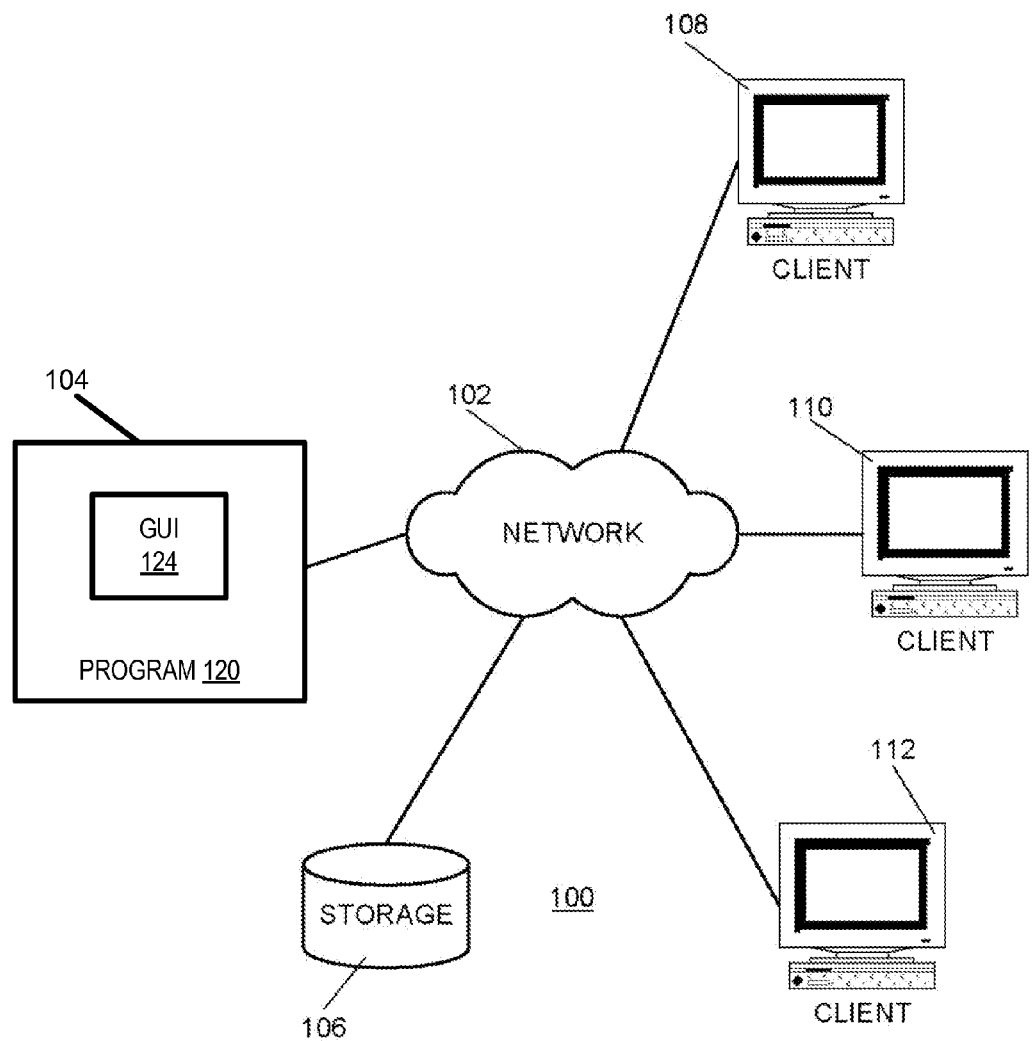
FIG. 1 is an exemplary block diagram illustrating a distributed data processing system according to embodiments of the invention.

Regarding FIG. 1, a pictorial representation of a network data processing system 100 is shown in which the present invention may be implemented. Network data processing system 100 contains a network 102, which is the medium used to provide communications links between various devices and computers connected together within network data processing system 100. Network 102 may include connections, such as wire, wireless communication links, or fiber optic cables etc.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108, 110 and 112. Clients 108, 110 and 112 are clients to server 104. Network data processing system 100 may include additional servers, clients, and other devices not shown. In the depicted example, network data processing system 100 is the Internet with network 102 representing a worldwide collection of networks and gateways that use the TCP/IP suite of protocols to communicate with one another.

Figure 2:
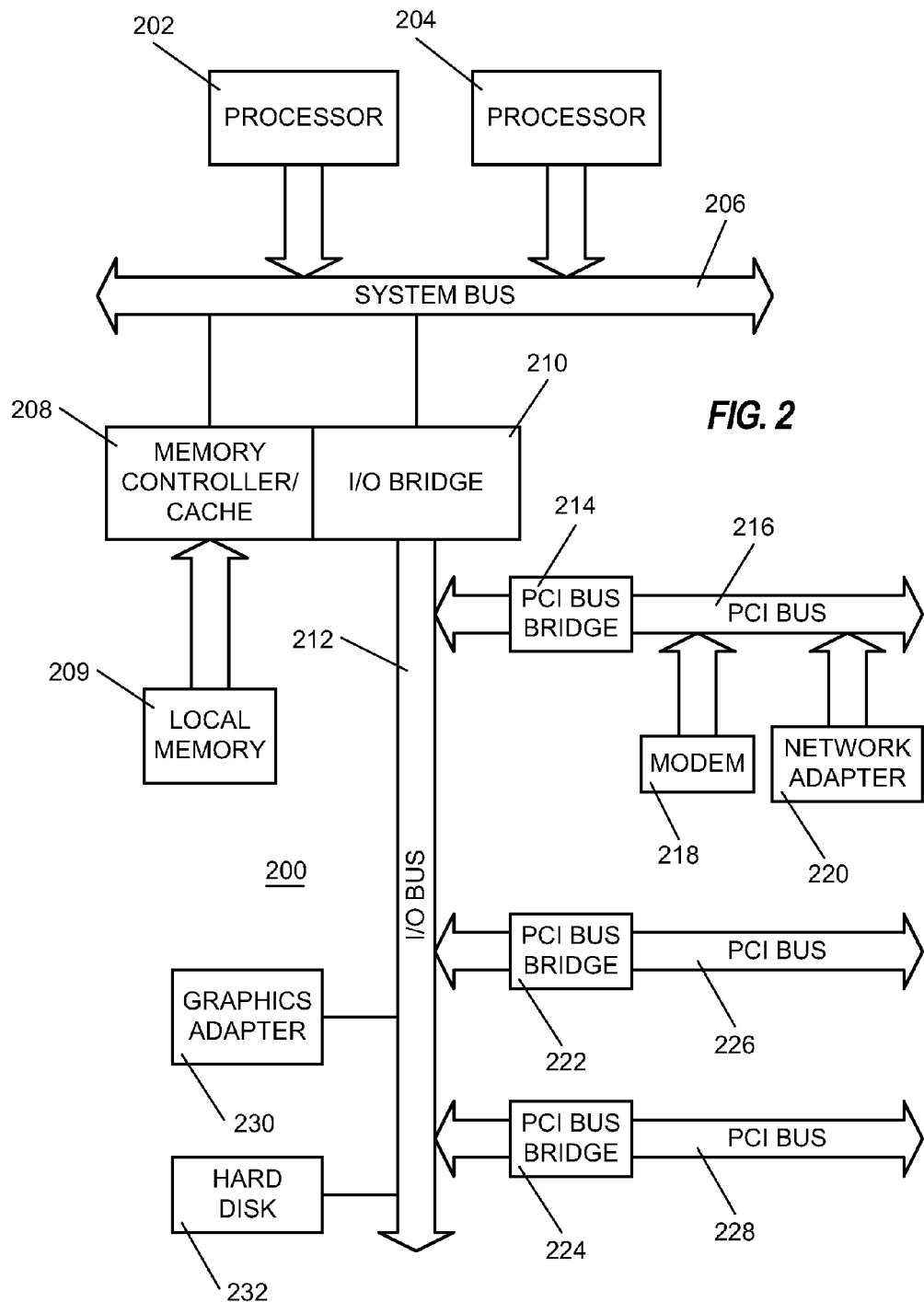
FIG. 2 is an exemplary block diagram of a server apparatus according to embodiments of the invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support one or more PCI expansion slots or add-in connectors. Communications links to network computers 108, 110 and 112 in FIG. 1 may be provided through modem 218 and network adapter 220 connected to PCI local bus 216 through add-in boards. Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM® eServer™ series system, running the IBM® AIX® operating system or LINUX® operating system. (IBM, eServer and AIXZ are trademarks of International Business Machines Corporation, registered in many jurisdictions worldwide. Linux is a registered trademark of Linus Torvalds in the United States, other countries, or both.)

Figure 3:
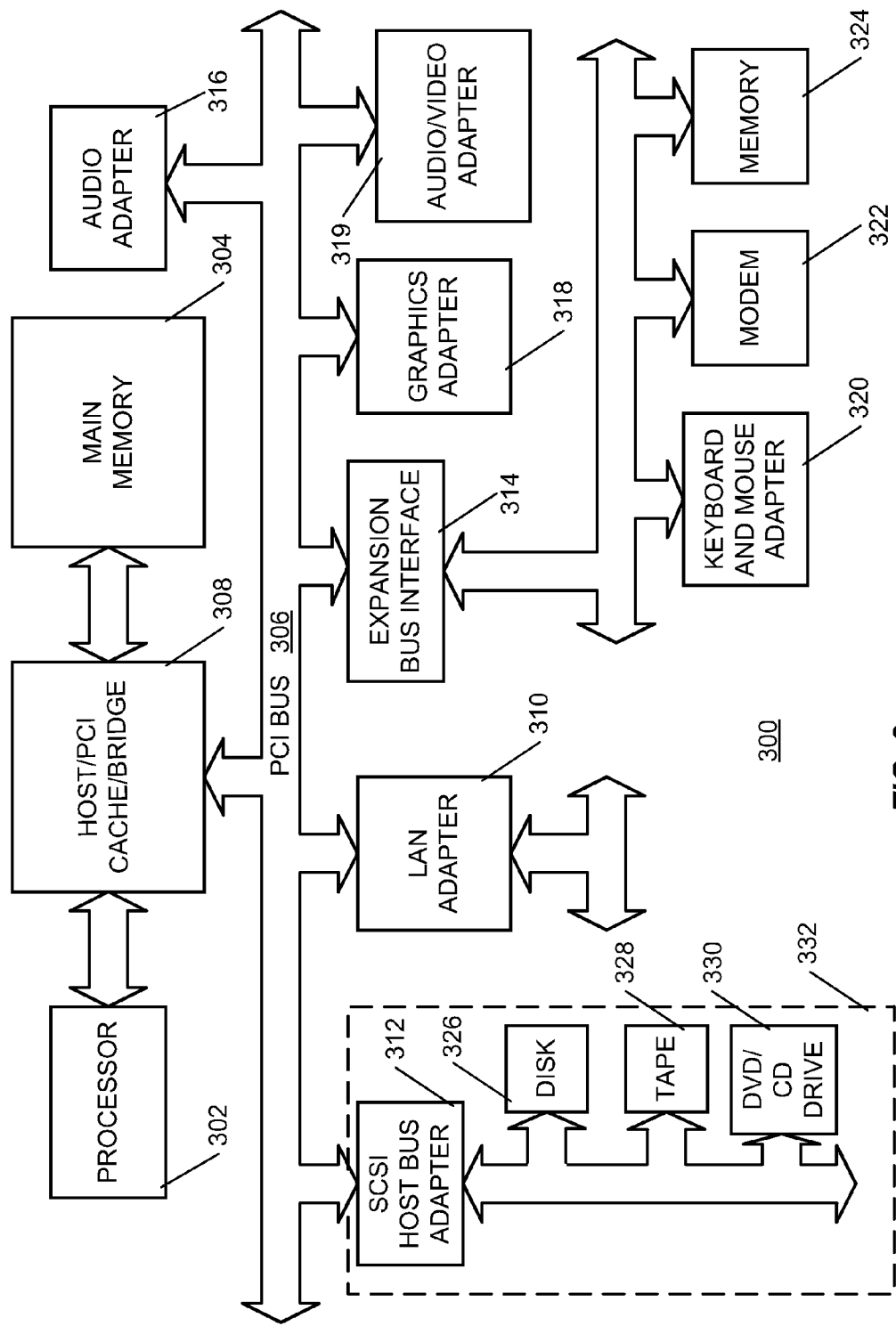
FIG. 3 is an exemplary block diagram of a client apparatus according to embodiments of the invention.

With reference now to FIG. 3, a block diagram illustrating a data processing system is depicted in which in an embodiment of the invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, small computer system interface (SCSI) host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots.

Expansion bus interface 314 provides a connection for a keyboard and mouse adapter 320, modem 322, and additional memory 324. SCSI host bus adapter 312 provides a connection for hard disk drive 326, tape drive 328, and CD-ROM drive 330. Typical PCI local bus implementations will support a plurality of PCI expansion slots or add-in connectors.

An operating system runs on processor 302 and is used to coordinate and provide control of various components within data processing system 300 in FIG. 3. The operating system may be any available operating system (commercial or open source). An object oriented programming system may run in conjunction with the operating system and provide calls to the operating system from programs or applications executing on data processing system 300. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 may also be a notebook computer or hand held computer as well as a PDA. Further, data processing system 300 may also be a kiosk or a Web appliance.

The present invention may be a system, a method, and/or a computer program product. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

One or more databases may be included in a host for storing and providing access to data for the various implementations. One skilled in the art will also appreciate that, for security reasons, any databases, systems, or components of the present invention may include any combination of databases or components at a single location or at multiple locations, wherein each database or system includes any of various suitable security features, such as firewalls, access codes, encryption, de-encryption and the like.

The database may be any type of database, such as relational, hierarchical, object-oriented, and/or the like. A database product that may be used to implement the databases is IBM® DB2®, or other available database products. (IBM and DB2 are trademarks of International Business Machines Corporation, registered in many jurisdictions worldwide.) The database may be organized in any suitable manner, including as data tables or lookup tables.

The host may provide a suitable website or other internet-based graphical user interface accessible by users. In one embodiment, Netscape web server, IBM® Websphere® Internet tools suite, an IBM DB2, universal database platform and a Sybase database platform are used in conjunction with a Sun Solaris operating system platform. (IBM and WebSphere are trademarks of International Business Machines Corporation, registered in many jurisdictions worldwide.) Additionally, components such as JBDC drivers, IBM connection pooling and IBM MQ series connection methods may be used to provide data access to several sources. The term webpage as it is used herein is not meant to limit the type of documents and applications that might be used to interact with the user. For example, a typical website might include, in addition to standard HTML documents, various forms, applets, scripts, extensible markup language (XML), dynamic HTML, cascading style sheets (CSS), helper applications, plug-ins, and the like.

Association of certain data may be accomplished through any data association technique known and practiced in the art. For example, the association may be accomplished either manually or automatically. Automatic association techniques may include, for example, a database search, a database merge, GREP, AGREP, SQL, and/or the like. The association step may be accomplished by a database merge function, for example, using a key field in each of the manufacturer and retailer data tables. A key field partitions the database according to the high-level class of objects defined by the key field. For example, a certain class may be designated as a key field in both the first data table and the second data table, and the two data tables may then be merged on the basis of the class data in the key field. In this embodiment, the data corresponding to the key field in each of the merged data tables is preferably the same. However, data tables having similar, though not identical, data in the key fields may also be merged by using AGREP, for example.

As used herein, the terms comprises, comprising, or any other variation thereof, are intended to cover a non-exclusive inclusion, such that a process, method, article, or apparatus that comprises a list of elements does not include only those elements but may include other elements not expressly listed or inherent to such process, method, article, or apparatus. Further, no element described herein is required for the practice of the invention unless expressly described as essential or critical.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed.

It should be appreciated that the particular implementations shown and described herein are illustrative of the invention and its best mode and are not intended to otherwise limit the scope of the present invention in any way. Other variations are within the scope of the following claims. Those skilled in the art having read this disclosure will recognize that changes and modifications may be made to the embodiments without departing from the scope of the present invention.

While this specification contains many specifics, these should not be construed as limitations on the scope of the invention or of what can be claimed, but rather as descriptions of features specific to particular implementations of the invention. Certain features that are described in this specification in the context of separate implementations can also be implemented in combination in a single implementation. Conversely, various features that are described in the context of a single implementation can also be implemented in multiple implementations separately or in any suitable subcombination. Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as critical, required, or essential features or elements of any or all the claims.

What is claimed is:

1. A method implemented by a central computer system for applying a central change statement to a selected plurality of target databases, the method comprising:

creating a central change identifier by the central computer system, wherein the central change statement defines a change to apply to the target databases, and associating the central change identifier with a user-generated, user-changeable central change name for a schema change to apply via the central change statement to all the selected plurality of target databases;

associating the central change identifier and the central change statement to each of the selected plurality of target databases, including the central computer system creating a respective association identifier for each respective one of the plurality of target databases;

providing the central change identifier, the central change statement and the respective association identifier for sending to each respective one of the selected plurality of target databases, wherein a particular association identifier provides a tag that associates a particular change with a particular target database, where the particular change is defined in the central change statement; and presenting, by the central computer system, a change statement indicator indicating occurrence of a current schema change processing event by one of the selected plurality of target databases, where the change statement indicator includes a change status and the central change identifier for the central change statement, where the presenting indicates, responsive to the central computer system receiving the change statement indicator with a certain one of the association identifiers created by the central computer system for a certain one of the selected plurality of target databases corresponding to the certain one of the association identifiers, occurrence of the current schema change processing event for the central change statement by the certain one of the selected plurality of target databases, and the presenting indicates occurrence of the current schema change processing event by the certain one of the selected plurality of target databases for a different change statement when the central computer system receives the change statement indicator without the certain one of the association identifiers created by the central computer system for the certain one of the selected plurality of target databases.

2. The method of claim 1, wherein when the change statement indicator received for the certain one of the selected plurality of target databases includes the association identifier for the certain one of the target databases, receiving the change statement indicator for the respective target database comprises:
  receiving both a time stamp and the association identifier for the certain one of the target databases.

3. The method of claim 1, wherein when the change statement indicator received for the certain one of the selected plurality of target databases includes a time stamp generated upon an initializing event for processing the central change statement by the certain one of the target databases and not the association identifier for the certain one of the target databases, presenting the change status associated with the central change identifier and the respective target database comprises:
  indicating the change status is associated with a different change statement.

4. The method of claim 1, wherein receiving the change status, the central change identifier and the change statement indicator includes receiving the change status, the central change identifier and the change statement indicator from a target database that is on a remote system.

5. The method of claim 1, wherein presenting the change statement indicator indicating occurrence of a current schema change processing event by the certain one of the selected plurality of target databases comprises:
  selecting a change status received from the certain one of the target databases for a processing event that occurred after an initializing event.

6. The method of claim 1, wherein providing the central change identifier, the central change statement and the respective association identifier for sending to each respective target database comprises:
  sending the central change identifier, the central change statement and the respective association identifier via network communication to a distributed relational database architecture compliant target database for automatic processing by the distributed relational database architecture compliant target database.

7. A system for applying a central change statement to a selected plurality of target databases, comprising:
  a processor; and
  computer readable storage media having instructions stored thereon for execution by the processor, wherein the instructions executed by the processor cause the processor to perform operations comprising:
  creating a central change identifier by the central computer system, wherein the central change statement defines a change to apply to the target databases, and associating the central change identifier with a user-generated, user-changeable central change name for a schema change to apply via the central change statement to all the selected plurality of target databases;
  associating the central change identifier and the central change statement to each of the selected plurality of target databases, including the central computer system creating a respective association identifier for each respective one of the plurality of target databases;
  providing the central change identifier, the central change statement and the respective association identifier for sending to each respective one of the selected plurality of target databases, wherein a particular association identifier provides a tag that associates a particular change with a particular target database, where the particular change is defined in the central change statement; and
  presenting, by the central computer system, a change statement indicator indicating occurrence of a current schema change processing event by one of the selected plurality of target databases, where the change statement indicator includes a change status and the central change identifier for the central change statement, where the presenting indicates, responsive to the central computer system receiving the change statement indicator with a certain one of the association identifiers created by the central computer system for a certain one of the selected plurality of target databases corresponding to the certain one of the association identifiers, occurrence of the current schema change processing event for the central change statement by the certain one of the selected plurality of target databases, and the presenting indicates occurrence of the current schema change processing event by the certain one of the selected plurality of target databases for a different change statement when the central computer system receives the change statement indicator without the certain one of the association identifiers created by the central computer system for the certain one of the selected plurality of target databases.

8. The system of claim 7, wherein when the change statement indicator received for the certain one of the plurality of target databases includes the association identifier for the certain one of the target databases, receiving the change statement indicator for the respective target database comprises:
  receiving both a time stamp and the association identifier for the certain one of the target databases.

9. The system of claim 7, wherein when the change statement indicator received for the certain one of the plurality of target databases includes a time stamp generated upon an initializing event for processing the central change statement by the certain one of the target databases and not the association identifier for the certain one of the target databases, presenting the change status associated with the central change identifier and the respective target database comprises:
  indicating the change status is associated with a different change statement.

10. The system of claim 7, wherein receiving the change status, the central change identifier and the change statement indicator includes receiving the change status, the central change identifier and the change statement indicator from a target database that is on a remote system.

11. The system of claim 7, wherein presenting the change statement indicator indicating occurrence of a current schema change processing event by the certain one of the selected plurality of target databases comprises:
  selecting a change status received from the certain one of the target databases for a processing event that occurred after an initializing event.

12. The system of claim 7, wherein providing the central change identifier, the central change statement and the respective association identifier for sending to each respective target database comprises:
  sending the central change identifier, the central change statement and the respective association identifier via network communication to a distributed relational database architecture compliant target database for automatic processing by the distributed relational database architecture compliant target database.

13. A computer program product for applying a central change statement to a selected plurality of target databases, including a computer readable storage medium having instructions stored thereon for execution by a computer, wherein the instructions, when executed by the computer, cause the computer to perform operations comprising:
creating a central change identifier by the central computer system, wherein the central change statement defines a change to apply to the target databases, and associating the central change identifier with a user-generated, user-changeable central change name for a schema change to apply via the central change statement to all the selected plurality of target databases;
associating the central change identifier and the central change statement to each of the selected plurality of target databases, including the central computer system creating a respective association identifier for each respective one of the plurality of target databases;
providing the central change identifier, the central change statement and the respective association identifier for sending to each respective one of the selected plurality of target databases, wherein a particular association identifier provides a tag that associates a particular change with a particular target database, where the particular change is defined in the central change statement; and
presenting, by the central computer system, a change statement indicator indicating occurrence of a current schema change processing event by one of the selected plurality of target databases, where the change statement indicator includes a change status and the central change identifier for the central change statement, where the presenting indicates, responsive to the central computer system receiving the change statement indicator with a certain one of the association identifiers created by the central computer system for a certain one of the selected plurality of target databases corresponding to the certain one of the association identifiers, occurrence of the current schema change processing event for the central change statement by the certain one of the selected plurality of target databases, and the presenting indicates occurrence of the current schema change processing event by the certain one of the selected plurality of target databases for a different change statement when the central computer system receives the change statement indicator without the certain one of the association identifiers created by the central computer system for the certain one of the selected plurality of target databases.

14. The computer program product of claim 13, wherein when the change statement indicator received for the certain one of the plurality of target databases includes the association identifier for the certain one of the target databases, receiving the change statement indicator for the respective target database comprises:
receiving both a time stamp and the association identifier for the certain one of the target databases.

15. The computer program product of claim 13, wherein when the change statement indicator received for the certain one of the plurality of target databases includes a time stamp generated upon an initializing event for processing the central change statement by the certain one of the target databases and not the association identifier for the respective target database, presenting the change status associated with the central change identifier and the respective target database comprises:
indicating the change status is associated with a different change statement.

16. The computer program product of claim 13, wherein receiving the change status, the central change identifier and the change statement indicator includes receiving the change status, the central change identifier and the change statement indicator from a target database that is on a remote system.

17. The computer program product of claim 13, wherein presenting the change statement indicator indicating occurrence of a current schema change processing event by the certain one of the selected plurality of target databases comprises:
selecting a change status received from the certain one of the target databases for a processing event that occurred after an initializing event.

* * * * *